Figure 2:
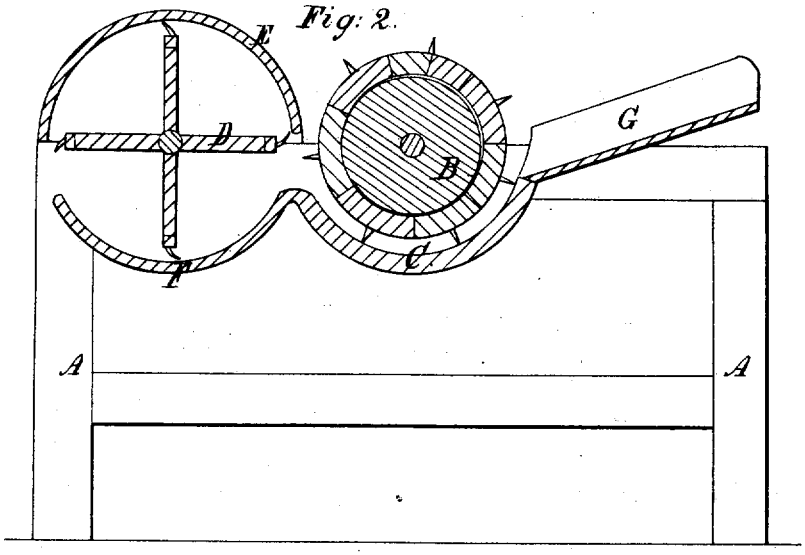
Figure 1:
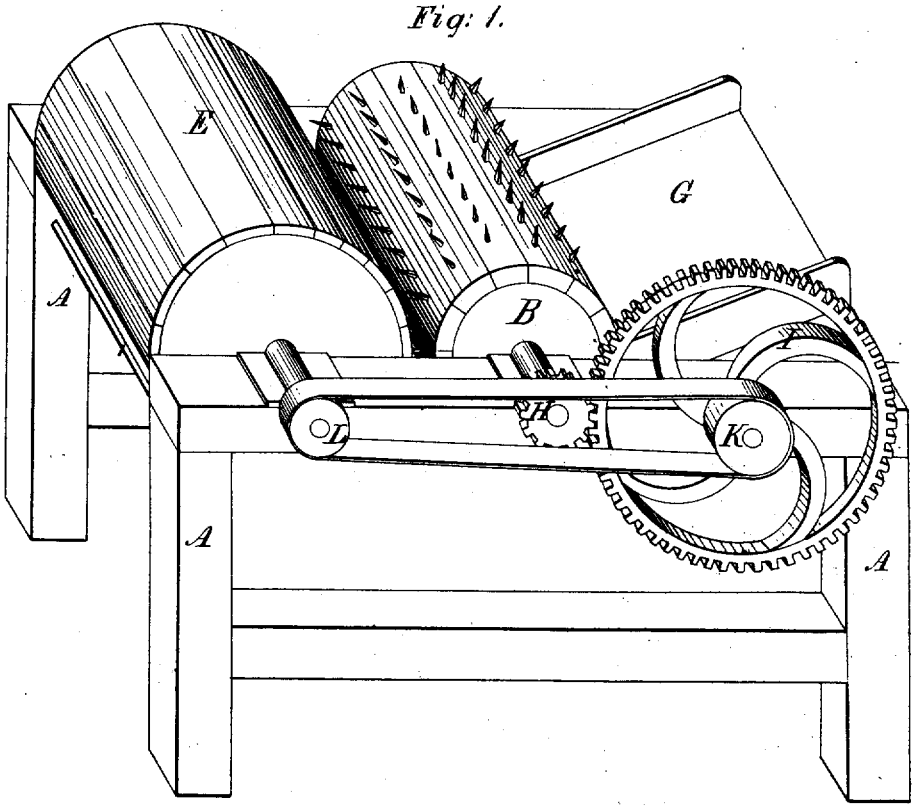

6511X

A. RICHISON.

Thrashing Machine.

Patented Apr. 22, 1831.

THE NORRIS PETERS CO., PHOTO-LITHO., WASHINGTON, D. C.

6511X [illegible] 191—
Apl 22. 1831

Andrew Richison of New Carlisle Ohio

Letters Patent.

The Schedule referred to in these Letters Patent and making part of same containing a description in the words of the said Andrew Richison himself of his improvement for the machine for Thrashing Grain.

Be it known that I Andrew Richison, of New Carlisle, Clark County, Ohio. have made an improvement in the machine for Thrashing Grain, which is described as follows.

This machine consists of the following parts: 1st The frame. 2nd The Thrashing Cylinder, 3d The Concave, 4th The Rake Drum and Screen. 5th The feeding Board, 6th. The Gearing 1st The frame may be made of any convenient size and strength adapted to the machinery to be constructed thereon, by mortising and tenoning together four posts to the side and end pieces.

2nd The Thrashing Cylinder. This is constructed by first making an axle about 1 1/2 inch in diameter: three wooden heads one for each end and one in the centre, the end ones to be plated with iron; the staves are next prepared about four inches thick. and the length of the intended cylinder. these are fastened slightly on the heads and turned true. the teeth about two inches long, made of wrought Iron are then inserted at proper distances apart, so as to intersect reciprocally with those in the concave bed to be hereafter described.

3. The concave. this is made of the same curvature as the Cylinder, filled with teeth of the same size, and placed the same distances apart as those in said Cylinder. It is placed on the lower side of it but rising a little in front, and is about one third its circumference. 4th. The Rake drum and Screen. The Rake is formed by placing eight arms about 3 feet 4 inches long in a centre or axle; at the extremity of each arm is mortised and tenoned a piece of wood to receive the teeth. which are about 4 inches long inclining backwards to discharge the straw. A Drum or case is made to surround the arms 6511X Apl 22, 1831 of the rake which are cased so as to work tight to prevent the grain from escaping. On the lower part of the drum is a screen about one third its circumference, on which the grain and straw are thrown, the grain falling through and the straw being thrown out by the teeth of the Rake. The Rake is calculated to have about one revolution to fifteen revolutions of the Thrashing Cylinder 5th. The feeding Board. This is an inclined plane placed in front of the Thrashing Cylinder, and even with the top of the concave.

6th The gearing. On the axle of the Thrashing Cylinder is placed a pinion working into a cogwheel of about 2 feet 4 inches diameter, turning on an axle supported in the frame. On this axis is placed a pulley over which a band passes to a pulley on the axis of the Rake. This machine may be moved by any known power.

Operation. The Grain to be Thrashed is introduced into the machine along the feeding board, it is conveyed by the Thrashing cylinder to the Concave bed, where the grain is rubbed out by the teeth. The grain and straw are then carried up an inclined plane into the the arms of the Rake and fall upon the screen; The Grain is then separated from the straw and falls through the screen and the straw is carried by the teeth of the Rake and thrown out at the hinder end of the machine.

The Invention here claimed is the construction and arrangement of the several parts of the machine, but particularly the mode before described, whereby the grain is separated from the straw and the latter thrown out by the Revolving Rake Washington 20th April 1831

Exd. Witnesses
[illegible] W. P. Elliot
Charles M Keller

Andrew Richeson